United States Patent
Gravina et al.

(10) Patent No.: US 12,540,669 B2
(45) Date of Patent: Feb. 3, 2026

(54) GEARBOX ASSEMBLY

(71) Applicant: GE Avio S.r.l., Rivalta di Torino (IT)

(72) Inventors: Michele Gravina, Milan (IT); Miriam Manzoni, Rivalta di Torino (IT); Federico Leonardi, Vinovo (IT); Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 186 days.

(21) Appl. No.: 18/477,960

(22) Filed: Sep. 29, 2023

(65) Prior Publication Data

US 2024/0280170 A1 Aug. 22, 2024

(30) Foreign Application Priority Data

Feb. 16, 2023 (IT) .......................... 102023000002661

(51) Int. Cl.
*F16H 57/04* (2010.01)
*F02C 7/36* (2006.01)

(52) U.S. Cl.
CPC ..... *F16H 57/0471* (2013.01); *F16H 57/0424* (2013.01); *F16H 57/0428* (2013.01); *F16H 57/0443* (2013.01); *F02C 7/36* (2013.01)

(58) Field of Classification Search
CPC ............. F16H 57/0471; F16H 57/0424; F16H 57/0428; F16H 57/0443; F16H 57/0409; F16H 57/0435; F16H 57/0441; F16H 57/0479; F16H 57/045; F16H 57/021; F16H 57/0421; F16H 57/0436; F16H 57/08; F16H 57/082; F03D 80/70; F02C 7/36; F16N 2210/12; F16N 2210/025
See application file for complete search history.

(56) References Cited

U.S. PATENT DOCUMENTS

| | | | |
|---|---|---|---|
| 2,371,228 A * | 3/1945 | Dodge | F16D 31/04 |
| | | | 475/108 |
| 3,147,821 A | 9/1964 | Eggenberger | |
| 4,245,465 A | 1/1981 | Milo | |

(Continued)

FOREIGN PATENT DOCUMENTS

DE 102018120044 A1 * 2/2020 ............. F16H 57/04

*Primary Examiner* — Tisha D Lewis
(74) *Attorney, Agent, or Firm* — Venable LLP; Peter T. Hrubiec; Michele V. Frank (57) ABSTRACT

A gearbox assembly includes a plurality of planet gears secured by a planet carrier. The plurality of planet gears and the planet carrier rotate about a longitudinal centerline axis. A planet pin is disposed in each planet gear. One or more journal bearings are defined by the planet pin and the planet gear, each planet gear rotating about the one or more journal bearings. The gearbox assembly includes an auxiliary lubrication system that stores lubricant therein. The auxiliary lubrication system includes one or more lubricant lines that provide fluid communication between the auxiliary lubrication system and the one or more journal bearings. Rotation of the planet carrier and the one or more journal bearings generates a suction effect that causes the lubricant in the auxiliary lubrication system to flow to the one or more journal bearings during windmilling conditions and during zero gravity conditions or negative gravity conditions.

20 Claims, 5 Drawing Sheets

(56) References Cited

U.S. PATENT DOCUMENTS

| | | | |
|---|---|---|---|
| 5,514,043 A * | 5/1996 | Antonov | F16H 3/722 |
| | | | 475/108 |
| 7,849,668 B2 | 12/2010 | Sheridan | |
| 8,020,665 B2 | 9/2011 | Sheridan et al. | |
| 8,230,974 B2 | 7/2012 | Parnin | |
| 8,307,626 B2 | 11/2012 | Sheridan | |
| 8,425,360 B2 * | 4/2013 | Nishida | F16C 33/1045 |
| | | | 475/159 |
| 8,511,435 B2 | 8/2013 | Sheridan et al. | |
| 8,876,647 B2 | 11/2014 | Gallet et al. | |
| 8,985,278 B2 | 3/2015 | Xu | |
| 9,410,448 B2 | 8/2016 | Sheridan et al. | |
| 9,995,174 B2 | 6/2018 | McCune et al. | |
| 10,196,926 B2 | 2/2019 | Ketchum et al. | |
| 10,513,949 B2 | 12/2019 | Parnin et al. | |
| 10,634,053 B2 | 4/2020 | Schwarz et al. | |
| 11,125,167 B2 | 9/2021 | Sheridan | |
| 11,215,078 B2 | 1/2022 | Menczykalski et al. | |
| 2014/0331639 A1 | 11/2014 | Raimarckers et al. | |
| 2017/0138217 A1 * | 5/2017 | Schwarz | G01N 15/0656 |
| 2018/0171815 A1 | 6/2018 | Suciu et al. | |
| 2021/0148453 A1 | 5/2021 | Pennacino et al. | |

\* cited by examiner

GEARBOX ASSEMBLY

CROSS REFERENCE TO RELATED APPLICATIONS

The present application claims the benefit of Italian Patent Application No. 102023000002661, filed on Feb. 16, 2023, which is hereby incorporated by reference herein in its entirety.

TECHNICAL FIELD

The present disclosure relates generally to gearbox assemblies for engines, such as turbine engines.

BACKGROUND

A turbine engine generally includes a fan and a turbomachine arranged in flow communication with one another. The turbine engine may include one or more gearbox assemblies, and a lubrication system for providing lubricant to one or more components of the one or more gearbox assemblies.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

BRIEF SUMMARY AND DETAILED DESCRIPTION

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low" and "high," or their respective comparative degrees (e.g., "lower" and "higher," where applicable), when used with the compressor, turbine, shaft, or spool components, each refers to relative pressures and/or relative speeds within an engine unless otherwise specified. For example, a "low-speed" component defines a component configured to operate at a rotational speed, such as a maximum allowable rotational speed, which is lower than that of a "high-speed" component of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the term "axial" refers to directions and orientations that extend substantially parallel to a longitudinal centerline of the turbine engine. Moreover, the terms "radial" and "radially" refer to directions and orientations that extend substantially perpendicular to the longitudinal centerline of the turbine engine. In addition, as used herein, the term "circumferentially" refers to directions and orientations that extend arcuately about the longitudinal centerline of the turbine engine.

As used herein, "windmill," "windmilling," or "windmilling conditions" is a condition when the fan and the low-pressure shaft of the turbine engine continue to rotate at low speeds, while the high-pressure shaft rotates slowly or even stops. This can occur when the turbine engine is shut down, but air still flows across the fan, such as during an in-flight engine shutdown or when the turbine engine is on the ground and the fan is rotating in the presence of wind when the turbine engine is shut down.

As used herein, "positive gravity conditions" occur when gravity experienced by the turbine engine is positive, such as when the turbine engine is subject to acceleration resulting from the combination of gravity and/or maneuver accelerations, having at least one vector component directed towards the bottom of the turbine engine. For example, positive gravity conditions occur when the turbine engine is parked on the ground, or during leveled flight phases.

As used herein, "zero gravity," "zero gravity conditions," "negative gravity," or "negative gravity conditions" occur when gravity experienced by the turbine engine is approximately zero or negative, such as when the turbine engine is subject to an acceleration resulting from the combination of gravity and/or maneuver accelerations, having at least one vector component directed towards the top of the turbine engine. For example, zero gravity conditions or negative gravity conditions could occur when the turbine engine is accelerating toward the Earth at a rate equal to or greater than the rate of gravity, or decelerating at the end of a vertical ascent.

The present disclosure provides for a lubrication system for a gearbox assembly of a turbine engine. The gearbox assembly is utilized to transfer power and torque from a turbine shaft, such as a low-pressure shaft, to the fan of the turbine engine. The gearbox assembly includes an epicyclic gear assembly including a sun gear, a plurality of planet gears secured by a planet carrier, and a ring gear. The gearbox assembly is configured in a planetary configuration in which the ring gear is held stationary, and the planet carrier rotates such that the plurality of planet gears rotate about a longitudinal centerline axis of the turbine engine. In operation, the gearbox assembly transfers the torque transmitted from the turbine shaft operating at a first speed to a fan shaft rotating at a second, lower speed. Such a gearbox assembly can be utilized in turbine engines for propelling aircraft, such as commercial aircraft, or the like.

The gearbox assembly includes one or more journal bearings that allow rotation of the plurality of planet gears about the one or more journal bearings. The lubrication system includes a primary lubrication system that supplies lubricant (e.g., oil) to the gearbox assembly for lubricating various components of the gearbox assembly, such as, for example, the gears and the journal bearings. The primary lubrication system includes a lubricant pump that pumps the lubricant from a main lubricant tank to supply the lubricant to the journal bearings and the gears.

The journal bearings typically require a steady supply of lubricant during all operational phases of the turbine engine in order to properly lubricate the journal bearings to allow rotation of the plurality of planet gears. In some instances, the gearbox assembly may experience short duration, high-power lubricant interruptions, such as those occurring at zero gravity conditions or negative gravity conditions. For example, the lubricant in the main lubricant tank and/or the lubricant in the sump may rise to the top of the main lubricant tank and the sump, respectively, such that the lubricant pump is unable to pump the lubricant from the main lubricant tank and from the sump. The gearbox assembly may also experience long duration, continued rotation following a shutdown of the turbine engine, such as those occurring at windmilling conditions.

In such instances, the gears and the journal bearings can be affected by not receiving enough lubricant for lubricating the gears and the journal bearings. The criticality of the lubricant interruptions increases for the journal bearings since the absence of lubricant at the journal bearings can lead to a journal bearing seizure and consequent over-torque for the plurality of planet gears to rotate about the journal bearings. Journal bearing seizure occurs when there is contact between the planet pin and the bore of the planet gear, thereby causing a significant increase of friction and temperature up to welding of the two components and consequent over-torque.

Some gearbox assemblies include a special design of the gearbox sump and of the main lubricant tank to cope with negative gravity conditions. Such configurations, however, add weight to the turbine engine. Some gearbox assemblies include an auxiliary lubrication system to supply lubricant to the journal bearings and to the gears to prevent damage to the gearbox assembly due to inadequate lubricant supply during windmilling, zero gravity, or negative gravity. Such auxiliary lubrication systems, however, typically require an additional pump (e.g., a fan-driven pump or an electrical pump) that adds weight to the turbine engine.

Accordingly, the present disclosure provides an auxiliary lubrication system that supplies lubricant to the gearbox assembly during windmilling conditions, and during zero gravity conditions or negative gravity conditions. The lubrication system includes a zero-leakage (or near zero-leakage), static-to-rotating, lubricant transfer device. In normal operating conditions (e.g., positive gravity conditions), lubricant is pressurized through the lubricant transfer device and fed to the journal bearings and to the gears through dedicated lubricant channels. The lubrication system includes the primary lubricant pump and a scavenge pump that are driven by the high-pressure shaft. The auxiliary lubrication system includes an auxiliary lubricant reservoir that stores auxiliary lubricant therein, and an auxiliary lubricant line.

During negative gravity conditions and windmilling conditions, the planet carrier and the journal bearings rotate and generate a suction effect for supplying the auxiliary lubricant from the auxiliary lubricant reservoir to the journal bearings through the auxiliary lubricant line. For example, the suction effect is created by a pressure difference between the rotating planet carrier and journal bearings, and the auxiliary lubricant tank or the sump. In this way, the rotating planet carrier and journal bearings function as a centrifugal pump to suck the auxiliary lubricant from the auxiliary lubricant reservoir or from the sump. Thus, the auxiliary lubrication system (e.g., the rotating planet carrier and journal bearings) causes the auxiliary lubricant to flow from the auxiliary lubricant reservoir without the use of an additional pump.

During zero gravity or negative gravity, enough auxiliary lubricant is ensured by refilling the auxiliary lubricant reservoir during positive gravity conditions. During windmilling, enough lubricant is ensured by recirculating the lubricant inside the sump.

Accordingly, the auxiliary lubrication system helps to prevent journal bearing seizure during windmilling conditions and during zero gravity conditions or negative gravity conditions, without the use of pumps, thereby, reducing the weight of the turbine engine, and, thus, the propulsive efficiency of the turbine engine, compared to turbine engines without the benefit of the present disclosure.

Figure 1:
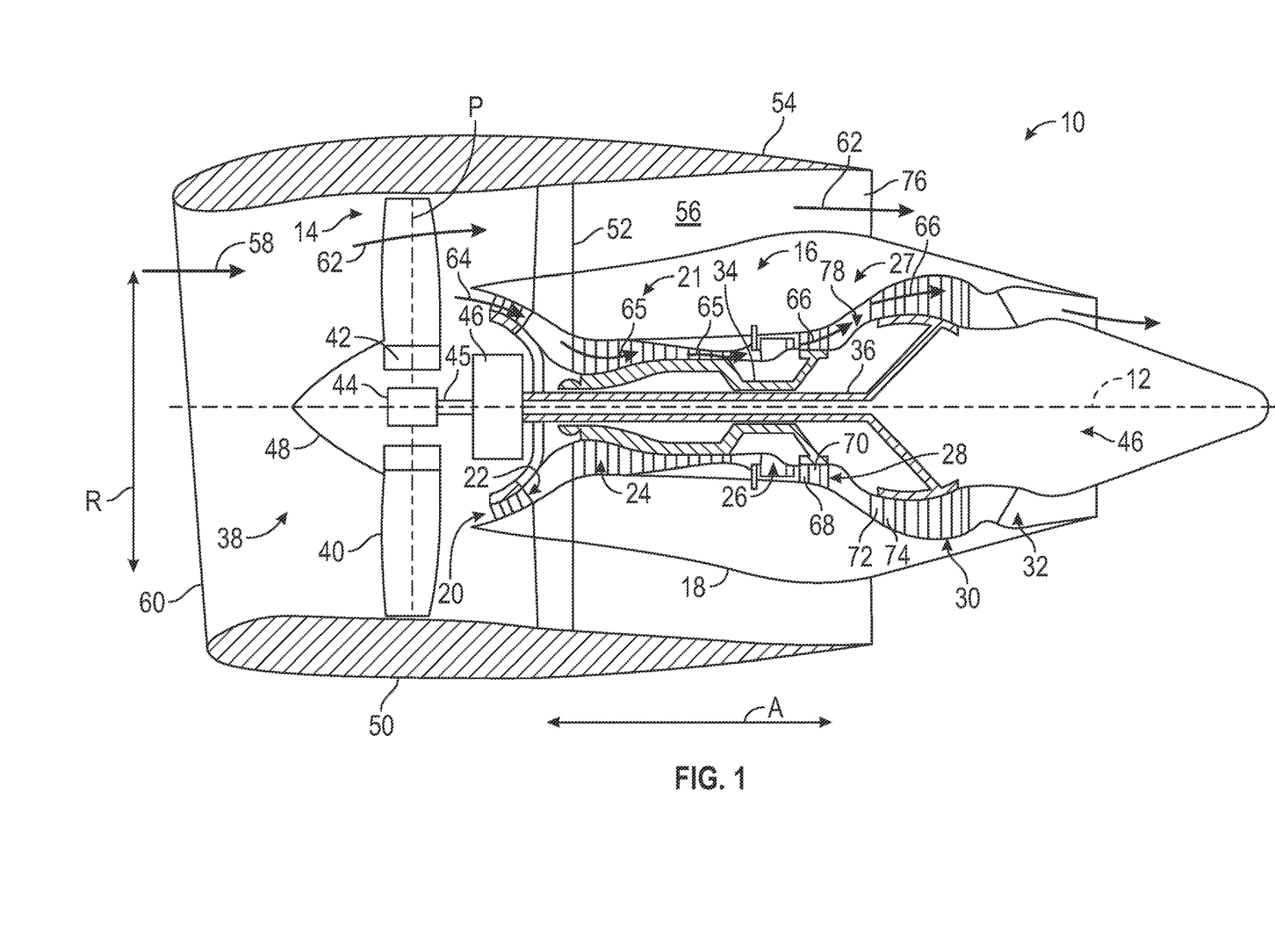
FIG. 1 is a schematic, cross-sectional diagram of a turbine engine, taken along a longitudinal centerline axis of the turbine engine, according to the present disclosure.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbomachine 16 disposed downstream from the fan section 14.

The turbomachine 16 depicted generally includes an outer casing 18 that is substantially tubular and defines an annular inlet 20. As schematically shown in FIG. 1, the outer casing 18 encases, in serial flow relationship, a compressor section 21 including a booster or a low-pressure (LP) compressor 22 followed downstream by a high-pressure (HP) compressor 24, a combustion section 26, a turbine section 27 including a high-pressure (HP) turbine 28 followed downstream by a low-pressure (LP) turbine 30, and a jet exhaust nozzle section 32. A high-pressure (HP) shaft 34 or spool drivingly connects the HP turbine 28 to the HP compressor 24 to rotate the HP turbine 28 and the HP compressor 24 in unison. A low-pressure (LP) shaft 36 or spool drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbomachine 16. The nacelle 50 is supported relative to the turbomachine 16 by a plurality of circumferentially spaced outlet guide vanes 52. Moreover, a downstream section 54 of the nacelle 50 extends over an outer portion of the turbomachine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2:
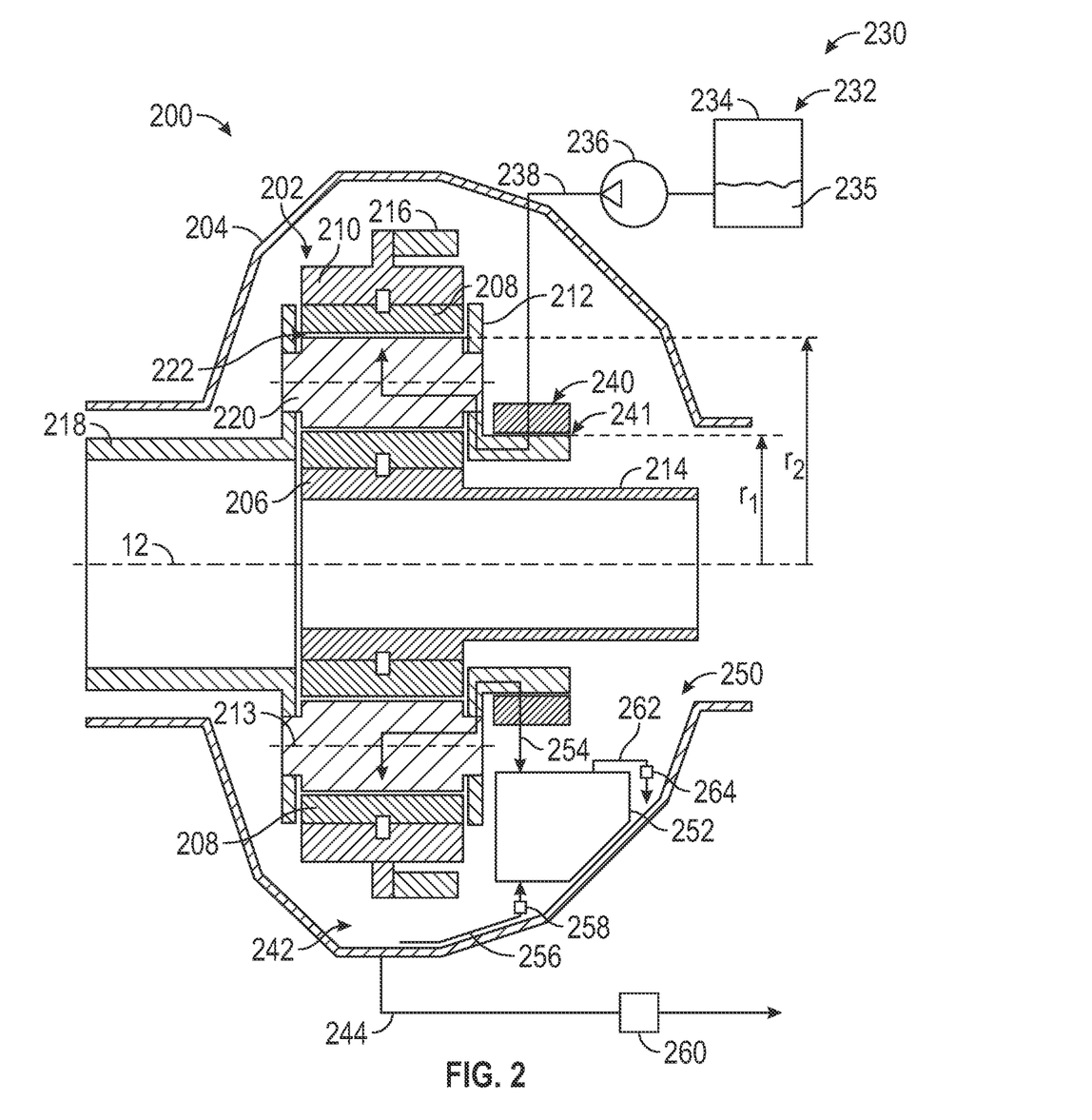
FIG. 2 is a schematic, cross-sectional side view of a gearbox assembly for the turbine engine of FIG. 1, taken along a longitudinal centerline axis of the turbine engine, according to the present disclosure.

FIG. 2 is a schematic, cross-sectional side view of a gearbox assembly 200 for the turbine engine 10 (FIG. 1), taken along a longitudinal centerline axis 12 of the turbine engine 10, according to the present disclosure. The gearbox assembly 200 can be utilized as the gearbox assembly 46 of FIG. 1.

The gearbox assembly 200 includes an epicyclic gear assembly 202 enclosed by a gearbox casing 204. The epicyclic gear assembly 202 includes a sun gear 206, a plurality of planet gears 208 (only two of which are visible in FIG. 2), and a ring gear 210. For clarity, only a portion of the gears is shown. The plurality of planet gears 208 are contained and supported by a planet carrier 212 (shown schematically in FIG. 2). The gearbox assembly 200 is a planetary configuration, in which the ring gear 210 is held fixed, with the planet carrier 212 allowed to rotate. For example, the ring gear 210 is coupled to a static structure 216 of the turbine engine 10 (FIG. 1). In such an arrangement, the fan 38 (FIG. 1) is driven by the planet carrier 212. In this way, the plurality of planet gears 208 are an output of the gearbox assembly 200.

The gearbox assembly 200 includes an input shaft 214. In FIG. 2, the input shaft 214 and the sun gear 206 are a single unitary component. In some embodiments, the sun gear 206 and the input shaft 214 are separate components and the input shaft 214 is coupled to the sun gear 206. The input shaft 214 is coupled to the turbine section (FIG. 1). For example, the input shaft 214 can be coupled to, or can embody, the LP shaft 36 (FIG. 1). Radially outward of the sun gear 206, and intermeshing therewith, is the plurality of planet gears 208 that are coupled together and supported by the planet carrier 212. The planet carrier 212 supports the plurality of planet gears 208 such that the plurality of planet gears 208 rotate around the sun gear 206 while enabling each planet gear 208 of the plurality of planet gears 208 to rotate about a planet gear longitudinal centerline axis 213 of each planet gear 208. For example, the planet carrier 212 is coupled via an output shaft 218 to the fan 38 (FIG. 1) and rotates to drive rotation of the fan 38 (FIG. 1) about the longitudinal centerline axis 12. For example, the output shaft 218 is coupled to the fan shaft 45 (FIG. 1). In some embodiments, the output shaft 218 and the fan shaft 45 (FIG.

1) are formed as a single integral component. Radially outwardly of the plurality of planet gears 208, and intermeshing therewith, is the ring gear 210, which is an annular ring gear.

Each of the planet gears 208 includes a planet pin 220, about which a respective planet gear 208 rotates. For example, the planet pin 220 is disposed within a respective planet gear 208. Together, the planet pin 220 and the planet gears 208 define one or more journal bearings 222 that allow a respective planet gear 208 to rotate about the planet pin 220. For example, lubricant 235 (e.g., oil) is provided between the planet pin 220 and a respective planet gear 208 such that the planet gear 208 rotates with respect to the planet pin 220, as detailed further below.

The gearbox assembly 200 includes a lubrication system 230 for supplying the lubricant 235 (e.g., oil) to the journal bearings 222 of each planet gear 208, as well as to other components of the gearbox assembly 200 (e.g., the sun gear 206, the ring gear 210, etc.). The lubrication system 230 includes a primary lubrication system 232. The primary lubrication system 232 includes a main lubricant tank 234 for storing lubricant 235 therein. For example, the main lubricant tank 234 can store oil therein. The primary lubrication system 232 includes several components, among which are a lubricant pump 236 and a primary lubricant line 238. The lubricant pump 236 is coupled to and powered by the HP shaft 34 (FIG. 1). For example, rotation of the HP shaft 34 causes the lubricant pump 236 to pump the lubricant 235 from the main lubricant tank 234. The lubricant pump 236 can include any type of pump for pumping the lubricant 235 from the main lubricant tank 234. The primary lubricant line 238 is coupled to a lubricant transfer device 240 for transferring the lubricant 235 from the primary lubricant line 238 to the planet pin 220 as the planet carrier 212, and, thus, the planet gears 208 and the planet pin 220, rotate about the longitudinal centerline axis 12. In this way, the lubricant transfer device 240 allows transfer of the lubricant 235 from a stationary component (e.g., the primary lubricant line 238) to a rotating component (e.g., the planet pin 220).

The gearbox assembly 200 also includes a sump 242 and a scavenge line 244. The sump 242 is located at a bottom of the gearbox assembly 200 in the orientation of the gearbox assembly 200 shown in FIG. 2. The lubricant 235 supplied to the gearbox is drained into the sump 242. In this way, the sump 242 serves as a reservoir for collecting and storing lubricant 235 that drains from the journal bearings 222 or from other portions of the gearbox assembly 200. For example, gravity causes the lubricant 235 to flow from the journal bearings 222 to the sump 242 during operation of the gearbox assembly 200. The scavenge line 244 provides fluid communication from the sump 242 to a scavenge pump (not shown in the view of FIG. 2), to a deaerator (not shown in the view of FIG. 2), and then to the main lubricant tank 234. In this way, the lubricant 235 in the sump 242 is provided from the sump 242 back to the main lubricant tank 234 through the scavenge line 244 such that the lubricant 235 circulates through the primary lubrication system 232.

In operation, the lubricant pump 236 pumps lubricant 235 from the main lubricant tank 234 into the primary lubricant line 238. The primary lubricant line 238 operably directs the lubricant 235 into the lubricant transfer device 240. The lubricant transfer device 240 operably directs the lubricant 235 into the planet pin 220 through the planet carrier 212. The planet pin 220 then operably directs the lubricant 235 to the journal bearings 222. In this way, the lubricant 235 is supplied to the journal bearings 222 to lubricate the journal bearings 222, and, thus, allow rotation of the planet gear 208 about the planet pin 220 (e.g., about the planet gear longitudinal centerline axis 213 of the planet gear 208) reducing friction. The lubricant 235 flows from the journal bearings 222 to the sump 242 after lubricating the journal bearings 222. The lubricant 235 then flows back to the main lubricant tank 234 through the scavenge line 244.

In some instances, the lubricant pump 236 may not adequately pump the lubricant 235 from main lubricant tank 234. For example, the fan 38 (FIG. 1) may windmill and the input shaft 214 may not rotate fast enough to pump enough lubricant 235 from the main lubricant tank 234 while the fan 38 (FIG. 1) is windmilling, as detailed above. In this way, the primary lubrication system 232 does not provide an adequate amount of lubrication to the journal bearings 222 during windmilling. Further, the lubricant 235 may rise above the primary lubricant line 238 within the main lubricant tank 234 during zero gravity conditions or negative gravity conditions when the lubricant tank 234 is not full. In this way, the lubricant pump 236 only pumps air into the primary lubricant line 238 as the lubricant 235 is above the primary lubricant line 238, and the lubricant pump 236 is unable to pump the lubricant 235 from the main lubricant tank 234 during zero gravity conditions or negative gravity conditions. Moreover, the scavenge pump may not be able to extract the lubricant 235 from the sump 242 and ensure the lubricant 235 is returned to the main lubricant tank 234 during the zero gravity conditions or negative gravity conditions. Accordingly, the present disclosure provides for an auxiliary lubrication system 250 that provides lubricant 235 to the journal bearings 222 during windmilling conditions and zero gravity conditions or negative gravity conditions.

The auxiliary lubrication system 250 includes an auxiliary lubricant reservoir 252 and an auxiliary lubricant line 254. The auxiliary lubricant reservoir 252 stores lubricant 235 therein, and a suction effect is created to supply the lubricant 235 from the auxiliary lubricant reservoir 252 to the journal bearings 222 through the auxiliary lubricant line 254, as detailed further below. The auxiliary lubrication system 250 also includes a sump line 256 to provide fluid communication from the sump 242 to the auxiliary lubricant reservoir 252. The primary lubricant line 238, the auxiliary lubricant line 254, and the sump line 256 are each referred to as "lubricant lines" such that the lubrication system 230 includes one or more lubricant lines.

The sump line 256 includes a sump line valve 258 to regulate the flow of the lubricant 235 from the sump 242 to the auxiliary lubricant reservoir 252. For example, the sump line valve 258 is a check valve that opens when the pressure of the lubricant 235 in the auxiliary lubricant reservoir 252 drops below a predetermined threshold to allow the lubricant 235 to flow from the sump 242 and into the auxiliary lubricant reservoir 252 through the sump line 256. The sump line valve 258 can include any type of valve for allowing the lubricant 235 to flow from the sump 242 to the auxiliary lubricant reservoir 252.

The auxiliary lubrication system 250 also includes a scavenge line valve 260 that closes to prevent the lubricant 235 from draining from the sump 242 through the scavenge line 244. In the embodiment of FIG. 2, the scavenge line valve 260 includes a shut-off valve disposed in the scavenge line 244. The scavenge line valve 260 can include any type of valve disposed in the scavenge line 244 or in the sump 242 for preventing the lubricant 235 from draining from the sump 242 and into the scavenge line 244 when the scavenge line valve 260 is closed.

The auxiliary lubricant reservoir 252 includes an overflow line 262 for allowing excess lubricant 235 to overflow from the auxiliary lubricant reservoir 252. The overflow line 262 provides fluid communication from the auxiliary lubricant reservoir 252 to the sump 242 such that the excess lubricant 235 flows from the auxiliary lubricant reservoir 252 and into the sump 242 through the overflow line 262. The overflow line 262 is positioned on a top of the auxiliary lubricant reservoir 252 in the orientation of the auxiliary lubricant reservoir 252 shown in FIG. 2. In this way, the lubricant 235 is provided from the auxiliary lubricant reservoir 252 and into the sump 242 through the overflow line 262 as the auxiliary lubricant reservoir 252 fills with lubricant 235.

The overflow line 262 includes an overflow line valve 264 to regulate the flow of the excess lubricant 235 from the auxiliary lubricant reservoir 252 to the sump 242. The overflow line valve 264 is a check valve that opens when the pressure of the excess lubricant 235 in the overflow line 262 exceeds a predetermined threshold to allow the lubricant 235 to flow from the auxiliary lubricant reservoir 252 to the sump 242 through the overflow line 262. In particular, the overflow line valve 264 remains closed during zero gravity conditions and negative gravity conditions to prevent the auxiliary lubricant reservoir 252 from emptying during such conditions. The overflow line valve 264 can include any type of valve for allowing the excess lubricant 235 to flow from the auxiliary lubricant reservoir 252 to the sump 242.

The planet carrier 212 and the journal bearings 222 rotate to create a suction effect to supply the lubricant 235 from the auxiliary lubricant reservoir 252 to the journal bearings 222 through the auxiliary lubricant line 254. The lubricant transfer device 240 includes a lubricant transfer device radius $r_1$ and the journal bearings 222 include a journal bearing outlet radius $r_2$. The lubricant transfer device radius $r_1$ is measured from the longitudinal centerline axis 12 of the gearbox assembly 200 (e.g., of the turbine engine of FIG. 1) to an outlet 241 of the lubricant transfer device 240. The journal bearing outlet radius $r_2$ is measured from the longitudinal centerline axis 12 of the gearbox assembly 200 to the journal bearings 222 (e.g., to an outlet of a journal bearing lubricant feed line of the journal bearings 222).

The lubricant transfer device radius $r_1$ corresponds to an inlet of the planet carrier 212 and the journal bearing outlet radius $r_2$ corresponds to an outlet of the planet carrier 212. The journal bearing outlet radius $r_2$ is greater than the lubricant transfer device radius $r_1$. In this way, as the planet carrier 212 and the journal bearings 222 rotate, the difference between the journal bearing outlet radius r2 and the lubricant transfer device radius r2 generates a suction effect. For example, the rotation of the planet carrier 212 and the journal bearings 222 generates a centrifugal force that causes a centrifugal pressure due to the difference between the journal bearing outlet radius $r_2$ and the lubricant transfer device radius $r_1$. In this way, the planet carrier 212 and the journal bearings 222 function as a centrifugal pump to pump the lubricant 235 from the auxiliary lubricant reservoir 252 and/or from the sump 242 and to the journal bearings 222 through the auxiliary lubricant line 254.

In positive gravity conditions, the primary lubrication system 232 operates as detailed above to supply the lubricant 235 from the main lubricant tank 234 to the journal bearings 222. While the primary lubrication system 232 supplies the lubricant 235, the pressure inside the journal bearings 222 causes the lubricant 235 in the journal bearing 222 to flow into the auxiliary lubricant reservoir 252 through the auxiliary line 254 to fill the auxiliary lubricant reservoir 252 with lubricant 235 for storing the lubricant in the auxiliary lubricant reservoir 252. When the auxiliary lubricant reservoir 252 is full, excess lubricant 235 flows from the auxiliary lubricant reservoir 252 back to the sump 242 through the overflow line 262. For example, when the auxiliary lubricant reservoir 252 is full, the pressure in the auxiliary lubricant reservoir 252 increases such that the overflow line valve 264 opens to allow the lubricant 235 to flow from the auxiliary lubricant reservoir 252 to the sump 242 through the overflow line 262. In this way, the auxiliary lubricant reservoir 252 is continuously supplied with lubricant during positive gravity conditions to ensure that the auxiliary lubricant reservoir 252 remains full of lubricant 235. The configuration of the lubrication system 230 shown in FIG. 2 helps to reduce gearbox windage losses by draining part of the unused lubricant 235 from the journal bearings 222 to the auxiliary lubricant reservoir 252 to fill the auxiliary lubricant reservoir 252 during the positive gravity conditions.

During zero gravity conditions or negative gravity conditions, the primary lubrication system 232 may not be able to supply the lubricant 235 from the main lubricant tank 234, as detailed above. In such conditions, the lubricant 235 is supplied from the auxiliary lubricant reservoir 252 to the journal bearings 222 through the auxiliary lubricant line 254. For example, the lubricant 235 is pumped (e.g., sucked) from the auxiliary lubricant reservoir 252 due to the rotation of the planet carrier 212 and the journal bearings 222, as detailed above. The auxiliary lubricant line 254 and the lubricant reservoir 252 are sized to provide enough lubricant 235 to the journal bearings 222 during the zero gravity conditions and the negative gravity conditions while minimizing the size of the auxiliary lubricant reservoir 252 to reduce the weight of the auxiliary lubricant reservoir 252, and, thus, reduce the weight of the turbine engine 10 (FIG. 1) compared to turbine engines that use an auxiliary lubrication system and an additional pump (e.g., fan-driven pump or electrical pump). For example, zero gravity or negative gravity typically occurs for a short period of time such that the auxiliary lubricant reservoir 252 only needs to store a small amount of lubricant 235 to supply the lubricant 235 to the journal bearings 222 during the zero gravity conditions or the negative gravity conditions to prevent journal bearing seizure during such conditions.

During windmilling conditions, the primary lubrication system 232 may not be able to supply the lubricant 235 from the main lubricant tank 234, as detailed above. In such conditions, the lubricant 235 is supplied from the auxiliary lubricant reservoir 252 to the journal bearings 222 through the auxiliary lubricant line 254. For example, the lubricant 235 is pumped from the auxiliary lubricant reservoir 252 due to the rotation of the planet carrier 212 and the journal bearings 222, as detailed above. Windmilling conditions may last for a longer period of time than zero gravity conditions or negative gravity conditions. In this way, all of the lubricant 235 in the auxiliary lubricant reservoir 252 may be supplied to the journal bearings 222 before the auxiliary lubricant reservoir 252 can be refilled. Accordingly, the lubricant 235 is supplied from the sump 242 to the journal bearings 222 through the sump line 256, then, through the auxiliary lubricant reservoir 252, and through the auxiliary lubricant line 254. For example, the pressure generated by the rotating planet carrier 212 and journal bearings 222 increases such that the sump line valve 258 opens to allow the lubricant 235 to flow from the sump 242 to the journal bearings 222. The sump line 256 is coupled to the auxiliary lubricant reservoir 252 and the sump line 256 provides the lubricant 235 from the sump 242 during windmilling as the auxiliary lubricant reservoir 252 through the auxiliary lubricant line 254 such that the auxiliary lubricant reservoir 252 is continuously replenished to remain full. In this way, there is no air in the auxiliary lubricant reservoir 252 and the planet carrier 212 and the journal bearings 222 generate the suction effect to continuously suck the lubricant 235 from the auxiliary lubricant reservoir 252 through the auxiliary lubricant line 254. Thus, during windmilling conditions, the rotation of the planet carrier 212 and the journal bearings 222 causes the lubricant 235 to be pumped (e.g., sucked) from the auxiliary lubricant reservoir 252 and then from the sump 242 to supply the journal bearings 222 with the lubricant 235. In this way, the auxiliary lubrication system 250 does not include a pump (e.g., a fan-driven pump or an electrical pump) to pump the lubricant 235 from the auxiliary lubrication system 250 to the journal bearings 222 during zero gravity conditions or negative gravity conditions and during windmilling conditions.

To ensure an adequate amount of lubricant 235 remains in the sump 242 to supply the journal bearings 222 with lubricant 235 during windmilling conditions, the scavenge line valve 260 closes when the turbine engine 10 (FIG. 1) shuts down. In this way, the lubricant 235 does not drain from the sump 242 after the turbine engine 10 is shut down, thereby ensuring the lubricant 235 is accumulated, and remains in the sump 242 such that the lubricant 235 can be supplied from the sump 242 to the journal bearings 222 when the fan 38 is windmilling.

Figure 3:
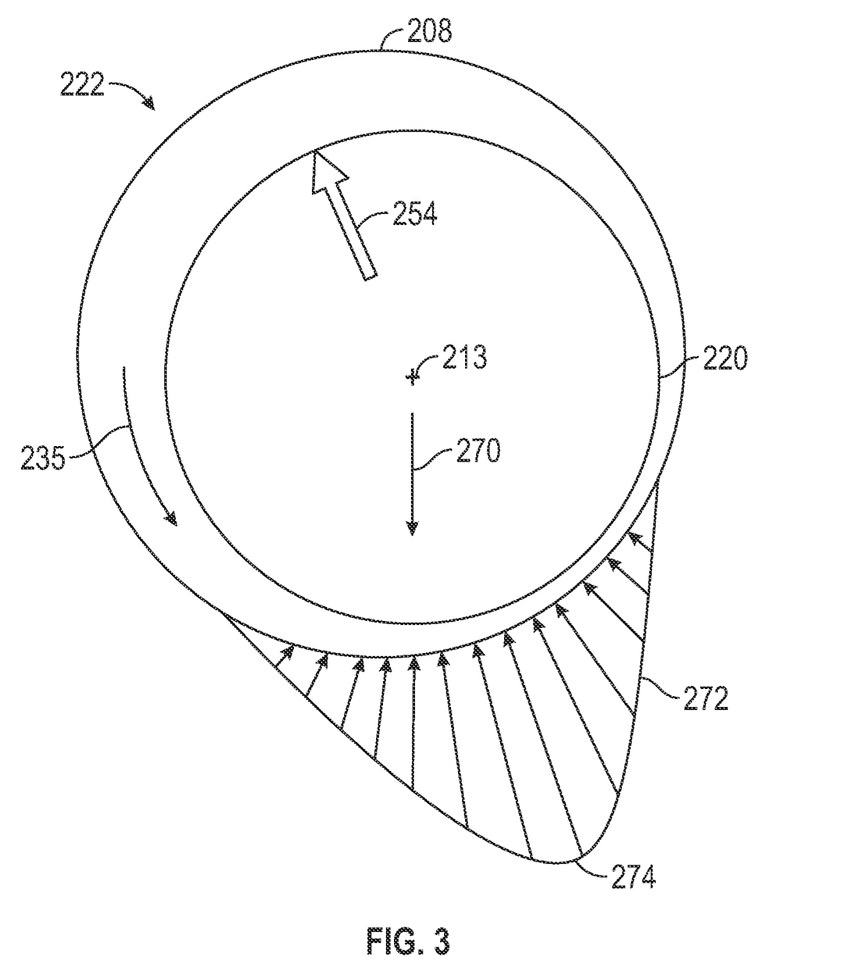
FIG. 3 is a schematic front view of a journal bearing of the gearbox assembly of FIG. 2, according to the present disclosure.

FIG. 3 is a schematic front view of a journal bearing 222, according to the present disclosure. A single planet gear 208 and a single planet pin 220 is shown in FIG. 3. The rotation of the planet gear 208 about the planet gear longitudinal centerline axis 213 creates a load 270 on the planet pin 220. Further, the rotation of the planet gear 208 about the longitudinal centerline axis 12 (FIG. 2) of the gearbox assembly 200 (FIG. 2) causes the planet pin 220 to be off-center from the center of the planet gear 208. Such a configuration generates a wedge-shaped fluid film of the lubricant 235, thereby causing a pressure distribution 272 on the journal bearings 222. The pressure distribution 272 includes a maximum pressure point 274. The auxiliary lubricant line 254 is positioned to supply the lubricant 235 at an angle with respect to the load 270. For example, the auxiliary lubricant line 254 is positioned (e.g., at an angular position) to supply the lubricant 235 on a side of the journal bearings 222 that is opposite the pressure distribution 272. In this way, the lubricant 235 is supplied to the journal bearings 222 at a location of minimum pressure such that the lubricant 235 can easily flow to the journal bearings 222. In a preferred embodiment, the auxiliary lubricant line 254 is positioned at an angle opposite of the maximum pressure point 274. Such a configuration of the auxiliary lubricant line 254 ensures a minimal amount of lubricant 235 is supplied to the journal bearings 222 without emptying the auxiliary lubricant reservoir 252 (FIG. 2) in a predetermined amount of time for a given speed of rotation. The position of the auxiliary lubricant line 254 in the location of minimum pressure also helps to avoid losing load carrying capacity of the journal bearings 222 during normal operation due to a local drop of pressure as the lubricant 235 drains from the journal bearings 222 through the auxiliary lubricant line 254.

Figure 4:
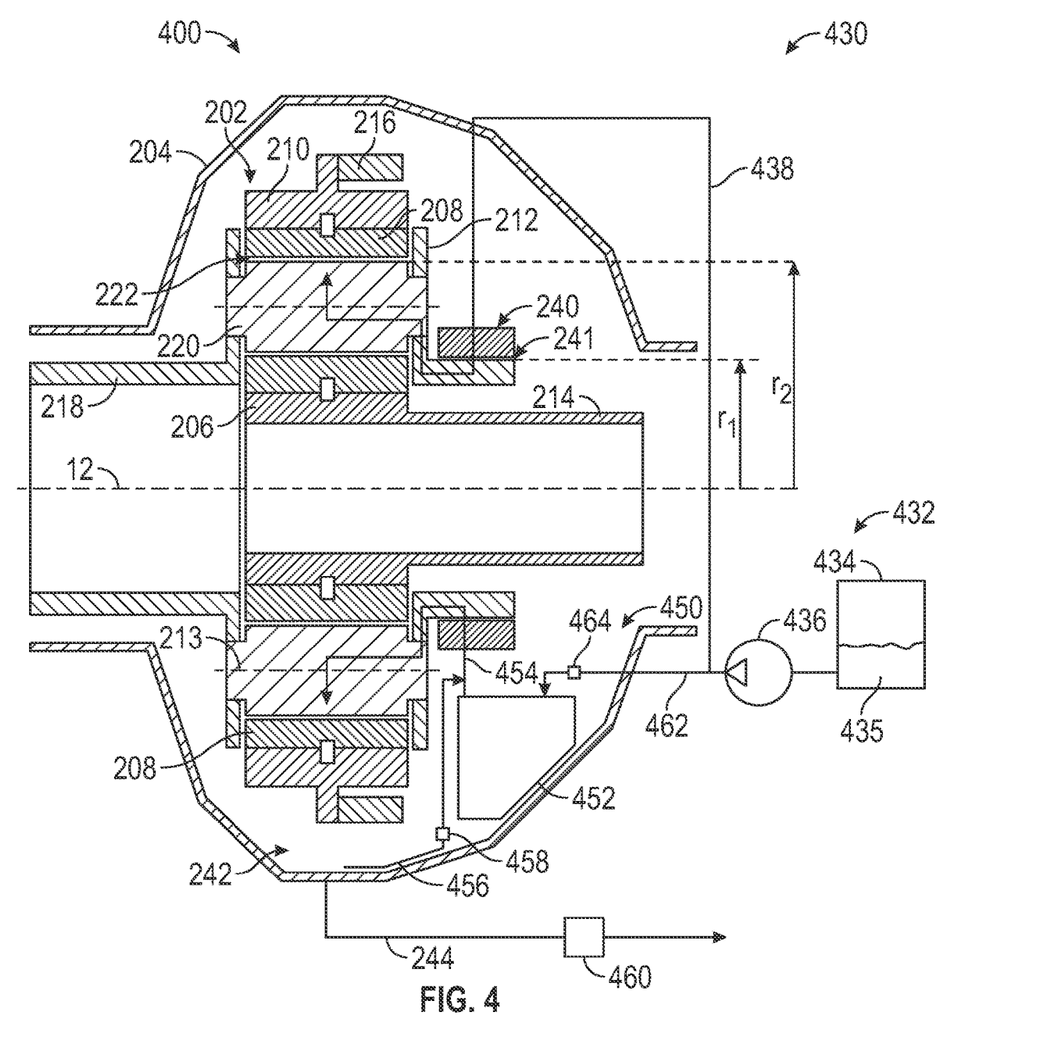
FIG. 4 is a schematic, cross-sectional side view of a gearbox assembly for the turbine engine of FIG. 1, taken along a longitudinal centerline axis of the turbine engine, according to another embodiment.

FIG. 4 is a schematic, cross-sectional side view of a gearbox assembly 400 for the turbine engine 10 (FIG. 1), taken along a longitudinal centerline axis 12 of the turbine engine 10, according to another embodiment. The gearbox assembly 400 can be utilized as the gearbox assembly 46 of FIG. 1. The gearbox assembly 400 includes many of the same or similar components as those of the gearbox assembly 200 of FIG. 2.

The gearbox assembly 400 includes a lubrication system 430 for supplying lubricant 435 (e.g., oil) to the journal bearings 222 of each planet gear 208, as well as to other components of the gearbox assembly 400 (e.g., the sun gear 206, the ring gear 210, etc.). The lubrication system 430 includes a primary lubrication system 432. The primary lubrication system 432 includes a main lubricant tank 434 for storing lubricant 435 therein. For example, the main lubricant tank 434 can store oil therein. The primary lubrication system 432 also includes a lubricant pump 436 and a primary lubricant line 438.

The primary lubricant line 438 is coupled to the lubricant transfer device 240 for transferring the lubricant 435 from the primary lubricant line 238 to the planet pin 220 as the planet carrier 212, and, thus, the planet gears 208 and the planet pin 220, rotate about the longitudinal centerline axis 12. In this way, the lubricant transfer device 240 facilitates transfer of the lubricant 435 from a stationary component (e.g., the primary lubricant line 438) to a rotating component (e.g., the planet pin 220). In operation, the lubricant pump 436 pumps lubricant 435 from the main lubricant tank 434 and into the primary lubricant line 438, as detailed above with respect to FIG. 2.

Similar to the embodiment of FIG. 2, the lubrication system 430 includes an auxiliary lubrication system 450 that provides lubricant 435 to the journal bearings 222 during windmilling conditions and negative-gravity conditions. The auxiliary lubrication system 450 is substantially similar to the auxiliary lubrication system 250 described in FIG. 2. For example, the auxiliary lubrication system 450 includes an auxiliary lubricant reservoir 452 and an auxiliary lubricant line 254, a sump line 456, a sump line valve 458, and a scavenge line valve 460. The auxiliary lubricant reservoir 452, however, does not include an overflow line. Rather, the primary lubricant line 438 includes a branch line 462 that provides fluid communication from the primary lubricant line 438 to the auxiliary lubricant reservoir 452. The primary lubricant line 438, the auxiliary lubricant line 454, and the sump line 456 are each referred to as "lubricant lines" such that the lubrication system 430 includes one or more lubricant lines.

The branch line 462 includes a branch line valve 464 to regulate the flow of the lubricant 435 from the primary lubricant line 438. For example, the branch line valve 464 is a check valve that opens when the pressure of the lubricant 435 in the primary lubricant line 438 exceeds a predetermined threshold to allow the lubricant 435 to flow from the primary lubricant line 438 to the auxiliary lubricant reservoir 452. The branch line valve 464 can include any type of valve for allowing the lubricant 435 to flow from the primary lubricant line 438 to the auxiliary lubricant reservoir 252.

Further, the sump line 456 is fluidly coupled to an auxiliary lubricant line 454 to provide fluid communication between the sump 242 and the auxiliary lubricant line 454. In this way, the lubricant 435 can flow from the sump 242 and into the auxiliary lubricant line 454. The sump line 456 is coupled to the auxiliary lubricant line 454 downstream of the auxiliary lubricant reservoir 452.

In positive gravity conditions, the primary lubrication system 432 operates as detailed above to supply the lubricant 435 from the main lubricant tank 434 to the journal bearings 222. While the primary lubrication system 432 supplies the lubricant 435, a portion of the lubricant is supplied to the auxiliary lubricant reservoir 452 through the branch line 462 to fill the auxiliary lubricant reservoir 452 with lubricant 435 for storing the lubricant 435 in the auxiliary lubricant reservoir 452. When the auxiliary lubricant reservoir 452 is full, the excess lubricant 435 in the auxiliary lubricant reservoir 452 is supplied to the journal bearings 222 through the auxiliary lubricant line 454. In this way, the auxiliary lubricant reservoir 452 is always full of the lubricant 435, and the lubricant 435 is supplied to the journal bearings 222 through the primary lubricant line 438 and through the auxiliary lubricant line 454 during the normal operating conditions (e.g., positive gravity conditions). The sump line valve 458 prevents the lubricant 435 from draining into the sump 242 through the sump line 456 during the normal operating conditions.

During zero gravity conditions or negative gravity conditions, the lubricant 435 is supplied from the auxiliary lubricant reservoir 452 to the journal bearings 222 through the auxiliary lubricant line 454, as detailed above. During windmilling conditions, the lubricant 435 is supplied from the sump 242 to the auxiliary lubricant line 454 through the sump line 456. For example, the scavenge line valve 460 closes when the turbine engine 10 (FIG. 1) is shut down and the suction effect generated by the rotating planet carrier 212 and the journal bearings 222 opens the sump line valve 458 to allow the lubricant 435 to flow from the sump 242 to the journal bearings 222. The lubricant 435 flows from the sump 242 directly into the auxiliary lubricant line 454 to supply the lubricant 435 to the journal bearings 222. In this way, the lubricant 435 does not flow through the auxiliary lubricant reservoir 452 during the windmilling condition in the embodiment of FIG. 4. Thus, the auxiliary lubrication system 450 does not include a pump (e.g., a fan-driven pump or an electrical pump) to pump the lubricant 435 from the auxiliary lubrication system 450 to the journal bearings 222 during zero gravity conditions or negative gravity conditions and during windmilling conditions. The configuration of the auxiliary lubrication system 450 shown in FIG. 4 helps to prevent the risk of sucking air from the auxiliary lubricant reservoir 452 during the windmilling conditions by providing the lubricant 435 directly from the sump 242 through the sump line 456.

Figure 5:
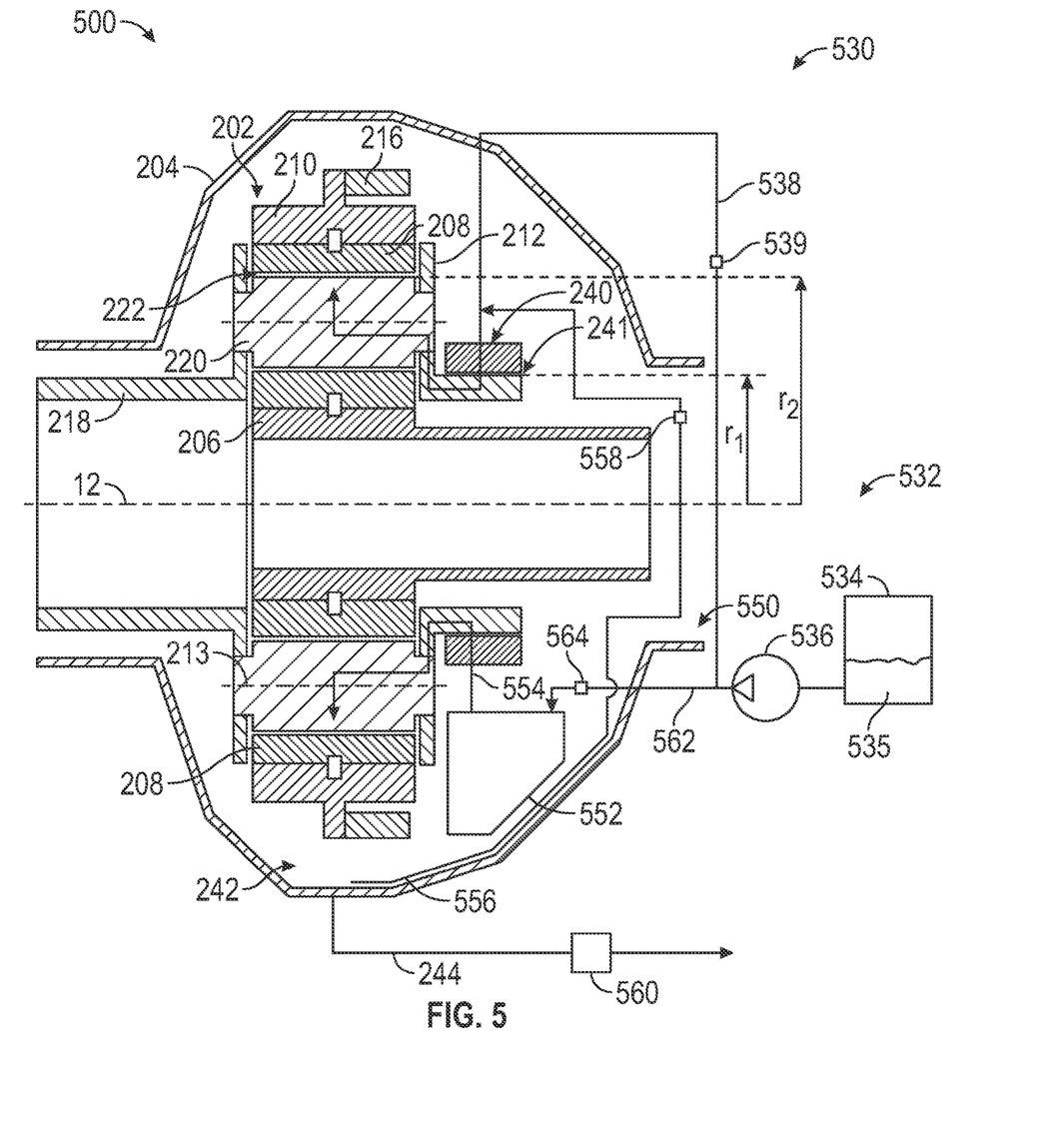
FIG. 5 is a schematic, cross-sectional side view of a gearbox assembly for the turbine engine of FIG. 1, taken along a longitudinal centerline axis of the turbine engine, according to another embodiment.

FIG. 5 is a schematic, cross-sectional side view of a gearbox assembly 500 for the turbine engine 10 (FIG. 1), taken along a longitudinal centerline axis 12 of the turbine engine 10, according to another embodiment. The gearbox assembly 500 can be utilized as the gearbox assembly 46 of FIG. 1. The gearbox assembly 500 includes many of the same or similar components as the gearbox assembly 200 of FIG. 2.

The gearbox assembly 500 includes a lubrication system 530 for supplying lubricant 535 (e.g., oil) to the journal bearings 222 of each planet gear 208, as well as to other components of the gearbox assembly 500 (e.g., the sun gear 206, the ring gear 210, etc.). The lubrication system 530 includes a primary lubrication system 532. The primary lubrication system 532 includes a main lubricant tank 534 for storing lubricant 535 therein. For example, the main lubricant tank 534 can store oil therein. The primary lubrication system 532 also includes a lubricant pump 536 and a primary lubricant line 538.

The primary lubricant line 538 is coupled to a lubricant transfer device 240 for transferring the lubricant 535 from the primary lubricant line 538 to the planet pin 220 as the planet carrier 212, and, thus, the planet gears 208 and the planet pin 220, rotate about the longitudinal centerline axis 12. In this way, the lubricant transfer device 240 facilitates transfer of the lubricant 535 from a stationary component (e.g., the primary lubricant line 538) to a rotating component (e.g., the planet pin 220). In operation, the lubricant pump 536 pumps lubricant 535 from the main lubricant tank 534 and into the primary lubricant line 538, as detailed above with respect to FIG. 2.

Similar to the embodiment of FIG. 2, the lubrication system 530 includes an auxiliary lubrication system 550 that provides lubricant 535 to the journal bearings 222 during windmilling conditions and negative-gravity conditions. The auxiliary lubrication system 550 is substantially similar to the auxiliary lubrication system 450 described in FIG. 4. For example, the auxiliary lubrication system 550 includes an auxiliary lubricant reservoir 552, an auxiliary lubricant line 554, a sump line 556, a sump line valve 558, a scavenge line valve 560, a branch line 562, and a branch line valve 564. The primary lubricant line 538, the auxiliary lubricant line 554, and the sump line 556 are each referred to as "lubricant lines" such that the lubrication system 230 includes one or more lubricant lines.

The primary lubricant line 538, however, includes a primary lubricant line valve 539 to regulate the flow of the lubricant 535 through the primary lubricant line 538. For example, the primary lubricant line valve 539 is a check valve that opens when the pressure of the lubricant 535 in the primary lubricant line 538 exceeds a predetermined threshold to allow the lubricant 535 to flow from the primary lubricant line 538 to the journal bearings 222. The primary lubricant line valve 539 can include any type of valve for allowing the lubricant 535 to flow from the primary lubricant line 538 to the journal bearings 222.

Further, the sump line 556 is fluidly coupled to the primary lubricant line 538 to provide fluid communication between the sump 242 and the primary lubricant line 538. In this way, the lubricant 535 can flow from the sump 242 and into the primary lubricant line 538. The sump line 556 is coupled to the primary lubricant line 538 downstream of the primary lubricant line valve 539.

In positive gravity conditions, the primary lubrication system 532 operates as detailed above to supply the lubricant 535 from the main lubricant tank 534 to the journal bearings 222. While the primary lubrication system 532 supplies the lubricant 535, a portion of the lubricant 535 is supplied to the auxiliary lubricant reservoir 552 through the branch line 562 to fill the auxiliary lubricant reservoir 552 with lubricant 535 for storing the lubricant 535 in the auxiliary lubricant reservoir 552. When the auxiliary lubricant reservoir 552 is full, the excess lubricant 535 in the auxiliary lubricant reservoir 552 is supplied to the journal bearings 222 through the auxiliary lubricant line 554. In this way, the auxiliary lubricant reservoir 552 is always full of the lubricant 535, and the lubricant 535 is supplied to the journal bearings 222 through the primary lubricant line 538 and through the auxiliary lubricant line 554 during the normal operating conditions (e.g., positive gravity conditions). The sump line valve 558 prevents the lubricant 535 from draining into the sump 242 through the sump line 556 during the normal operating conditions.

During zero gravity conditions or negative gravity conditions, the lubricant 535 is supplied from the auxiliary lubricant reservoir 552 to the journal bearings 222 through the auxiliary lubricant line 554, as detailed above. During windmilling conditions, the lubricant 535 is supplied from the sump 242 to the primary lubricant line 538 through the sump line 556. For example, the scavenge line valve 560 closes when the turbine engine 10 (FIG. 1) is shut down and the pressure generated by the rotating planet carrier 212 and the journal bearings 222 increases such that the sump line valve 558 opens to allow the lubricant 535 to flow from the sump 242 to the journal bearings 222. At the same time, the primary lubricant line valve 539 closes to prevent the lubricant 535 from flowing towards the lubricant pump 536 and the main lubricant tank 534 in case of failure of the primary lubrication system 532. The lubricant 535 flows from the sump 242 directly into the primary lubricant line 538 to supply the lubricant 535 to the journal bearings 222. In this way, the lubricant 535 does not flow through the auxiliary lubricant reservoir 552 during the windmilling condition in the embodiment of FIG. 5. Thus, the auxiliary lubrication system 550 does not include a pump (e.g., a fan-driven pump or an electrical pump) to pump the lubricant 535 from the auxiliary lubrication system 550 to the journal bearings 222 during zero gravity conditions or negative gravity conditions and during windmilling conditions. The configuration of the auxiliary lubrication system 550 shown in FIG. 5 allows flexibility in the selection of the size (e.g., the volume) of the auxiliary lubricant reservoir 552 and the auxiliary lubricant line 554 to avoid the auxiliary lubricant reservoir 552 from being emptied too quickly during the zero gravity conditions or the negative gravity conditions.

The present disclosure thus provides an auxiliary lubrication system 250, 450, 550 that pumps the lubricant 235, 435, 535 from the auxiliary lubricant reservoir 252, 452, 552 without the use of an additional pump (e.g., a fan-driven pump or electrical pump), thereby reducing a weight of the lubrication system 230, 430, 530, and, thus, reducing the weight of the turbine engine 10 (FIG. 1) as compared to lubrication systems and turbine engines without the benefit of the present disclosure. Accordingly, the auxiliary lubrication system 250, 450, 550 of the present disclosure provides lubricant 235, 435, 535 to the journal bearings 222 during windmilling conditions and during zero gravity conditions or negative gravity conditions in order to prevent journal bearing seizure during such conditions, without increasing a weight of the turbine engine 10.

Further aspects are provided by the subject matter of the following clauses.

A gearbox assembly comprises a plurality of planet gears secured by a planet carrier, the plurality of planet gears and the planet carrier rotating about a longitudinal centerline axis of the gearbox assembly, a planet pin disposed in each planet gear of the plurality of planet gears, one or more journal bearings disposed between the planet pin and the planet gear of the plurality of planet gears, each planet gear of the plurality of planet gears rotating about the one or more journal bearings, and an auxiliary lubrication system that stores lubricant therein, the auxiliary lubrication system including a lubricant line that provides fluid communication between the auxiliary lubrication system and the one or more journal bearings, rotation of the planet carrier and the one or more journal bearings generating a suction effect that causes the lubricant in the auxiliary lubrication system to flow through the lubricant line to the one or more journal bearings during windmilling conditions and during zero gravity conditions or negative gravity conditions.

The gearbox assembly of the preceding clause, further comprising a sun gear, a ring gear, an input shaft coupled to the sun gear, and an output shaft coupled to the planet carrier, torque being transferred from the input shaft to the output shaft through the gearbox assembly.

The gearbox assembly of any preceding clause, further comprising a sump for storing the lubricant therein, and a sump line, the suction effect causing the lubricant to flow from the sump through the sump line to the one or more journal bearings during the windmilling conditions.

The gearbox assembly of any preceding clause, further comprising a lubricant transfer device for transferring the lubricant to the one or more journal bearings.

The gearbox assembly of any preceding clause, the lubricant transfer device including a lubricant transfer device radius measured from the longitudinal centerline axis of the gearbox assembly, the one or more journal bearings include a journal bearing outlet radius measured from the longitudinal centerline axis of the gearbox assembly, and the journal bearing outlet radius is greater than the lubricant transfer device radius.

The gearbox assembly of any preceding clause, the auxiliary lubrication system comprising an auxiliary lubricant reservoir for storing the lubricant therein, and an auxiliary lubricant line that provides fluid communication between the auxiliary lubricant reservoir and the one or more journal bearings, and the suction effect causes the lubricant to flow from the auxiliary lubricant reservoir to the one or more journal bearings during the zero gravity conditions or the negative gravity conditions.

The gearbox assembly of any preceding clause, the auxiliary lubricant line being coupled to the one or more journal bearings at a position opposite of a pressure distribution on the one or more journal bearings.

The gearbox assembly of any preceding clause further comprises a primary lubrication system comprising a main lubricant tank that stores lubricant therein, a lubricant pump, and a primary lubricant line that provides fluid communication between the main lubricant tank and the one or more journal bearings, the lubricant pump pumping the lubricant from the main lubricant tank through the primary lubricant line to the one or more journal bearings.

The gearbox assembly of any preceding clause, further comprising a sump that stores lubricant therein, and a scavenge line that provides fluid communication from the sump to the main lubricant tank such that the lubricant in the sump flows through the scavenge line to the main lubricant tank.

The gearbox assembly of any preceding clause, the auxiliary lubrication system further comprising a scavenge line valve that closes during the windmilling conditions to prevent the lubricant in the sump from flowing through the scavenge line to the main lubricant tank during the windmilling conditions.

The gearbox assembly of any preceding clause, the ring gear being coupled to a static structure such that the ring gear is held fixed.

The gearbox assembly of any preceding clause, the input shaft being coupled to a low-pressure shaft of a turbine engine, and the output shaft being coupled to a fan shaft of the turbine engine.

The gearbox assembly of any preceding clause, the auxiliary lubrication system not including a pump to pump the lubricant from the auxiliary lubrication system to the one or more journal bearings.

The gearbox assembly of any preceding clause, the lubricant pump being coupled to a high-pressure shaft of the turbine engine such that rotation of the high-pressure shaft powers the lubricant pump.

The gearbox assembly of any preceding clause, the primary lubricant line being coupled to the lubricant transfer device for transferring lubricant from the primary lubricant line to the one or more journal bearings.

The gearbox assembly of any preceding clause, the lubricant pump pumping the lubricant from the main lubricant tank to the one or more journal bearings during normal operating conditions.

The gearbox assembly of any preceding clause, further comprising a pump that pumps the lubricant from the sump to the main lubricant tank.

The gearbox assembly of any preceding clause, the sump line including a sump line valve that opens during the windmilling conditions such that the lubricant flow from the sump to the one or more journal bearings.

The gearbox assembly of any preceding clause, the sump line being coupled to the auxiliary lubricant reservoir to provide fluid communication between the sump and the auxiliary lubricant reservoir.

The gearbox assembly of any preceding clause, further comprising an overflow line coupled to the auxiliary lubricant reservoir that provides fluid communication from the auxiliary lubricant reservoir to the sump such that the lubricant flows from the auxiliary lubricant reservoir through the overflow line into the sump.

The gearbox assembly of any preceding clause, the overflow line including an overflow line valve that opens such that the lubricant flows from the auxiliary lubricant reservoir through the overflow line.

The gearbox assembly of any preceding clause, the auxiliary lubricant line providing the lubricant from the one or more journal bearings to the auxiliary lubricant reservoir during normal operating conditions.

The gearbox assembly of any preceding clause, a difference between the journal bearing outlet radius and the lubricant transfer device radius generating the suction effect as the planet carrier and the one or more journal bearings rotate.

The gearbox assembly of any preceding clause, the planet carrier and the one or more journal bearings acting as a centrifugal pump to pump the lubricant from the auxiliary lubricant system.

The gearbox assembly of any preceding clause, the primary lubricant line including a branch line that provides fluid communication between the primary lubricant line and the auxiliary lubricant reservoir such that the lubricant flows from the primary lubricant line through the branch line to the auxiliary lubricant reservoir to fill the auxiliary lubricant reservoir with lubricant during normal operating conditions.

The gearbox assembly of any preceding clause, the branch line including a branch line valve that prevents emptying the auxiliary lubricant reservoir during the zero gravity conditions and the negative gravity conditions.

The gearbox assembly of any preceding clause, the sump line being coupled to the auxiliary lubricant line to provide fluid communication from the sump to the auxiliary lubricant line such that the lubricant is provided from the sump through the sump line and the auxiliary lubricant line to the one or more journal bearings during windmilling conditions.

The gearbox assembly of any preceding clause, the sump line being coupled to the primary lubricant line to provide fluid communication from the sump to the primary lubricant line such that the lubricant is provided from the sump through the sump line and the primary lubricant line to the one or more journal bearings during windmilling conditions.

The gearbox assembly of any preceding clause, the primary lubricant line comprising a primary lubricant line valve that closes to prevent the lubricant from flowing through the primary lubricant line to the main lubricant tank during windmilling conditions.

The gearbox assembly of any preceding clause, the auxiliary lubricant line being positioned to provide the lubricant to the one or more journal bearings at a position opposite a maximum pressure point of the one or more journal bearings.

A turbine engine comprising a fan having a fan shaft, a low-pressure turbine having a low-pressure shaft, and the gearbox assembly of any preceding clause, the fan shaft being coupled to the low-pressure shaft through the gearbox assembly.

A method of operating the gearbox assembly of any preceding clause, the method comprising generating a suction effect in the gearbox assembly by causing the planet carrier and the journal bearings to rotate, and causing, by the suction effect, the lubricant in the auxiliary lubrication system to flow through the lubricant line to the one or more journal bearings during windmilling conditions and during zero gravity conditions or negative gravity conditions.

The method of the preceding clause, the gearbox assembly further comprising a sun gear, a ring gear, an input shaft coupled to the sun gear, and an output shaft coupled to the planet carrier, the method further comprising transferring torque from the input shaft to the output shaft through the gearbox assembly.

The method of any preceding clause, the gearbox assembly further comprising a sump for storing the lubricant therein, and a sump line, the method further comprising causing, by the suction effect, the lubricant to flow from the sump through the sump line to the one or more journal bearings during the windmilling conditions.

The method of any preceding clause, the gearbox assembly further comprising a lubricant transfer device in fluid communication with the one or more journal bearings, the method further comprising transferring the lubricant to the one or more journal bearings through the lubricant transfer device.

The method of any preceding clause, the lubricant transfer device including a lubricant transfer device radius measured from the longitudinal centerline axis of the gearbox assembly, the one or more journal bearings include a journal bearing outlet radius measured from the longitudinal centerline axis of the gearbox assembly, and the journal bearing outlet radius is greater than the lubricant transfer device radius.

The method of any preceding clause, the auxiliary lubrication system comprising an auxiliary lubricant reservoir for storing the lubricant therein, and an auxiliary lubricant line that provides fluid communication between the auxiliary lubricant reservoir and the one or more journal bearings, the method further comprising causing, by the suction effect, the lubricant to flow from the auxiliary lubricant reservoir to the one or more journal bearings during the zero gravity conditions or the negative gravity conditions.

The method of any preceding clause, the auxiliary lubricant line being coupled to the one or more journal bearings at a position opposite of a pressure distribution on the one or more journal bearings.

The method of any preceding clause, the gearbox assembly further comprising a primary lubrication system comprising a main lubricant tank that stores lubricant therein, a lubricant pump, and a primary lubricant line that provides fluid communication between the main lubricant tank and the one or more journal bearings, the method further comprising pumping, by the lubricant pump, the lubricant from the main lubricant tank through the primary lubricant line to the one or more journal bearings.

The method of any preceding clause, the gearbox assembly further comprising a sump that stores lubricant therein, and a scavenge line that provides fluid communication from the sump to the main lubricant tank, the method further comprising causing the lubricant to flow from the sump through the scavenge line to the main lubricant tank.

The method of any preceding clause, the auxiliary lubrication system further comprising a scavenge line valve in fluid communication with the scavenge line, the method further comprising closing the scavenge line valve during the windmilling conditions to prevent the lubricant in the sump from flowing through the scavenge line to the main lubricant tank during the windmilling conditions.

The method of any preceding clause, the ring gear being coupled to a static structure such that the ring gear is held fixed.

The method of any preceding clause, the input shaft being coupled to a low-pressure shaft of a turbine engine, and the output shaft being coupled to a fan shaft of the turbine engine.

The method of any preceding clause, the auxiliary lubrication system not including a pump to pump the lubricant from the auxiliary lubrication system to the one or more journal bearings.

The method of any preceding clause, the lubricant pump being coupled to a high-pressure shaft of the turbine engine, the method further comprising operating the high-pressure shaft to power the lubricant pump.

The method of any preceding clause, the primary lubricant line being coupled to the lubricant transfer device, the method further comprising transferring lubricant from the primary lubricant line to the one or more journal bearings.

The method of any preceding clause, further comprising pumping, by the lubricant pump, the lubricant from the main lubricant tank to the one or more journal bearings during normal operating conditions.

The method of any preceding clause, further comprising pumping, with a pump, the lubricant from the sump to the main lubricant tank.

The method of any preceding clause, the sump line including a sump line valve, the method further comprising opening the sump line valve during the windmilling conditions such that the lubricant flow from the sump to the one or more journal bearings.

The method of any preceding clause, the sump line being coupled to the auxiliary lubricant reservoir to provide fluid communication between the sump and the auxiliary lubricant reservoir.

The method of any preceding clause, the gearbox assembly further comprising an overflow line coupled to the auxiliary lubricant reservoir that provides fluid communication from the auxiliary lubricant reservoir to the sump, the method further comprising causing the lubricant to flow from the auxiliary lubricant reservoir through the overflow line into the sump.

The method of any preceding clause, the overflow line including an overflow line valve, the method further comprising opening the overflow line valve such that the lubricant flows from the auxiliary lubricant reservoir through the overflow line.

The method of any preceding clause, further comprising providing, through the auxiliary lubricant line, the lubricant from the one or more journal bearings to the auxiliary lubricant reservoir during normal operating conditions.

The method of any preceding clause, a difference between the journal bearing outlet radius and the lubricant transfer device radius generating the suction effect as the planet carrier and the one or more journal bearings rotate.

The method of any preceding clause, the planet carrier and the one or more journal bearings acting as a centrifugal pump to pump the lubricant from the auxiliary lubricant system.

The method of any preceding clause, the primary lubricant line including a branch line that provides fluid communication between the primary lubricant line and the auxiliary lubricant reservoir, the method further comprising causing the lubricant to flow from the primary lubricant line through the branch line to the auxiliary lubricant reservoir to fill the auxiliary lubricant reservoir with lubricant during normal operating conditions.

The method of any preceding clause, the branch line including a branch line valve, the method further comprising closing the branch line valve during zero gravity conditions or negative gravity conditions.

The method of any preceding clause, the sump line being coupled to the auxiliary lubricant line to provide fluid communication from the sump to the auxiliary lubricant line, the method further comprising providing the lubricant from the sump through the sump line and the auxiliary lubricant line to the one or more journal bearings during windmilling conditions.

The method of any preceding clause, the sump line being coupled to the primary lubricant line to provide fluid communication from the sump to the primary lubricant line, the method further comprising providing the lubricant from the sump through the sump line and the primary lubricant line to the one or more journal bearings during windmilling conditions.

The method of any preceding clause, the primary lubricant line comprising a primary lubricant line valve, the method further comprising closing the primary lubricant line valve such that the lubricant flows from the sump into the primary lubricant line through the sump line.

The method of any preceding clause, the auxiliary lubricant line being positioned to provide the lubricant to the one or more journal bearings at a position opposite a maximum pressure point of the one or more journal bearings.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly comprising:
   a plurality of planet gears secured by a planet carrier, the plurality of planet gears and the planet carrier rotating about a longitudinal centerline axis of the gearbox assembly;
   a planet pin disposed in each planet gear of the plurality of planet gears;
   one or more journal bearings defined by the planet pin and the planet gear of the plurality of planet gears, each planet gear of the plurality of planet gears rotating about the one or more journal bearings;
   an auxiliary lubrication system that stores lubricant therein, the auxiliary lubrication system including one or more lubricant lines that provide fluid communication between the auxiliary lubrication system and the one or more journal bearings, wherein rotation of the planet carrier and the one or more journal bearings generates a suction effect that causes the lubricant in the auxiliary lubrication system to flow through the one or more lubricant lines to the one or more journal bearings during windmilling conditions and during zero gravity conditions or negative gravity conditions; and a lubricant transfer device for transferring the lubricant from the one or more lubricant lines to the one or more journal bearings, wherein the lubricant transfer device includes a lubricant transfer device radius measured from the longitudinal centerline axis of the gearbox assembly, the one or more journal bearings include a journal bearing outlet radius measured from the longitudinal centerline axis of the gearbox assembly, and the journal bearing outlet radius is greater than the lubricant transfer device radius.

2. The gearbox assembly of claim 1, further comprising a sun gear, a ring gear, an input shaft coupled to the sun gear, and an output shaft coupled to the planet carrier, wherein torque is transferred from the input shaft to the output shaft through the gearbox assembly.

3. The gearbox assembly of claim 1, further comprising a sump for storing the lubricant therein, and the one or more lubricant lines include a sump line, wherein the suction effect causes the lubricant to flow from the sump through the sump line to the one or more journal bearings during the windmilling conditions.

4. The gearbox assembly of claim 1, wherein the auxiliary lubrication system comprises an auxiliary lubricant reservoir for storing the lubricant therein, and the one or more lubricant lines include an auxiliary lubricant line that provides fluid communication between the auxiliary lubricant reservoir and the one or more journal bearings, and the suction effect causes the lubricant to flow from the auxiliary lubricant reservoir to the one or more journal bearings during the zero gravity conditions or the negative gravity conditions.

5. The gearbox assembly of claim 4, wherein the auxiliary lubricant line is coupled to the one or more journal bearings at a position opposite of a pressure distribution on the one or more journal bearings.

6. The gearbox assembly of claim 1, further comprising a primary lubrication system comprising:
 a main lubricant tank that stores lubricant therein;
 a lubricant pump; and
 a primary lubricant line that provides fluid communication between the main lubricant tank and the one or more journal bearings, wherein the lubricant pump pumps the lubricant from the main lubricant tank through the primary lubricant line to the one or more journal bearings.

7. The gearbox assembly of claim 6, further comprising a sump that stores lubricant therein, and a scavenge line that provides fluid communication from the sump to the main lubricant tank such that the lubricant in the sump flows through the scavenge line to the main lubricant tank.

8. The gearbox assembly of claim 7, wherein the auxiliary lubrication system further comprises a scavenge line valve that closes during the windmilling conditions to prevent the lubricant in the sump from flowing through the scavenge line to the main lubricant tank during the windmilling conditions.

9. A method of operating the gearbox assembly of claim 1, the method comprising:
 generating a suction effect in the gearbox assembly by causing the planet carrier and the journal bearings to rotate;
 causing, by the suction effect, the lubricant in the auxiliary lubrication system to flow through the one or more lubricant lines to the one or more journal bearings during the windmilling conditions and during the zero gravity conditions or the negative gravity conditions; and
 transferring the lubricant from the one or more lubricant lines to the one or more journal bearings through the lubricant transfer device.

10. The method of claim 9, wherein the gearbox assembly further comprises a sun gear, a ring gear, an input shaft coupled to the sun gear, and an output shaft coupled to the planet carrier, the method further comprising transferring torque from the input shaft to the output shaft through the gearbox assembly.

11. The method of claim 9, wherein the gearbox assembly further comprises a sump for storing the lubricant therein, and the one or more lubricant lines include a sump line, the method further comprising causing, by the suction effect, the lubricant to flow from the sump through the sump line to the one or more journal bearings during the windmilling conditions.

12. The method of claim 9, wherein the auxiliary lubrication system comprises an auxiliary lubricant reservoir for storing the lubricant therein, and the one or more lubricant lines include an auxiliary lubricant line that provides fluid communication between the auxiliary lubricant reservoir and the one or more journal bearings, the method further comprising causing, by the suction effect, the lubricant to flow from the auxiliary lubricant reservoir to the one or more journal bearings during the zero gravity conditions or the negative gravity conditions.

13. The method of claim 12, wherein the auxiliary lubricant line is coupled to the one or more journal bearings at a position opposite of a pressure distribution on the one or more journal bearings.

14. The method of claim 9, wherein the gearbox assembly further comprises a primary lubrication system comprising a main lubricant tank that stores lubricant therein, a lubricant pump, and a primary lubricant line that provides fluid communication between the main lubricant tank and the one or more journal bearings, the method further comprising pumping, by the lubricant pump, the lubricant from the main lubricant tank through the primary lubricant line to the one or more journal bearings.

15. The method of claim 14, wherein the gearbox assembly further comprises a sump that stores lubricant therein, and a scavenge line that provides fluid communication from the sump to the main lubricant tank, the method further comprising causing the lubricant to flow from the sump through the scavenge line to the main lubricant tank.

16. The method of claim 15, wherein the auxiliary lubrication system further comprises a scavenge line valve in fluid communication with the scavenge line, the method further comprising closing the scavenge line valve during the windmilling conditions to prevent the lubricant in the sump from flowing through the scavenge line to the main lubricant tank during the windmilling conditions.

17. The method of claim 10, where the ring gear is coupled to a static structure such that the ring gear is held fixed.

18. The method of claim 12, wherein the auxiliary lubricant reservoir is positioned within the gearbox assembly.

19. The gearbox assembly of claim 2, wherein the ring gear is coupled to a static structure such that the ring gear is held fixed.

20. The gearbox assembly of claim 4, wherein the auxiliary lubricant reservoir is positioned within the gearbox assembly.

\* \* \* \* \*